United States Patent Office 3,559,445
Patented Feb. 2, 1971

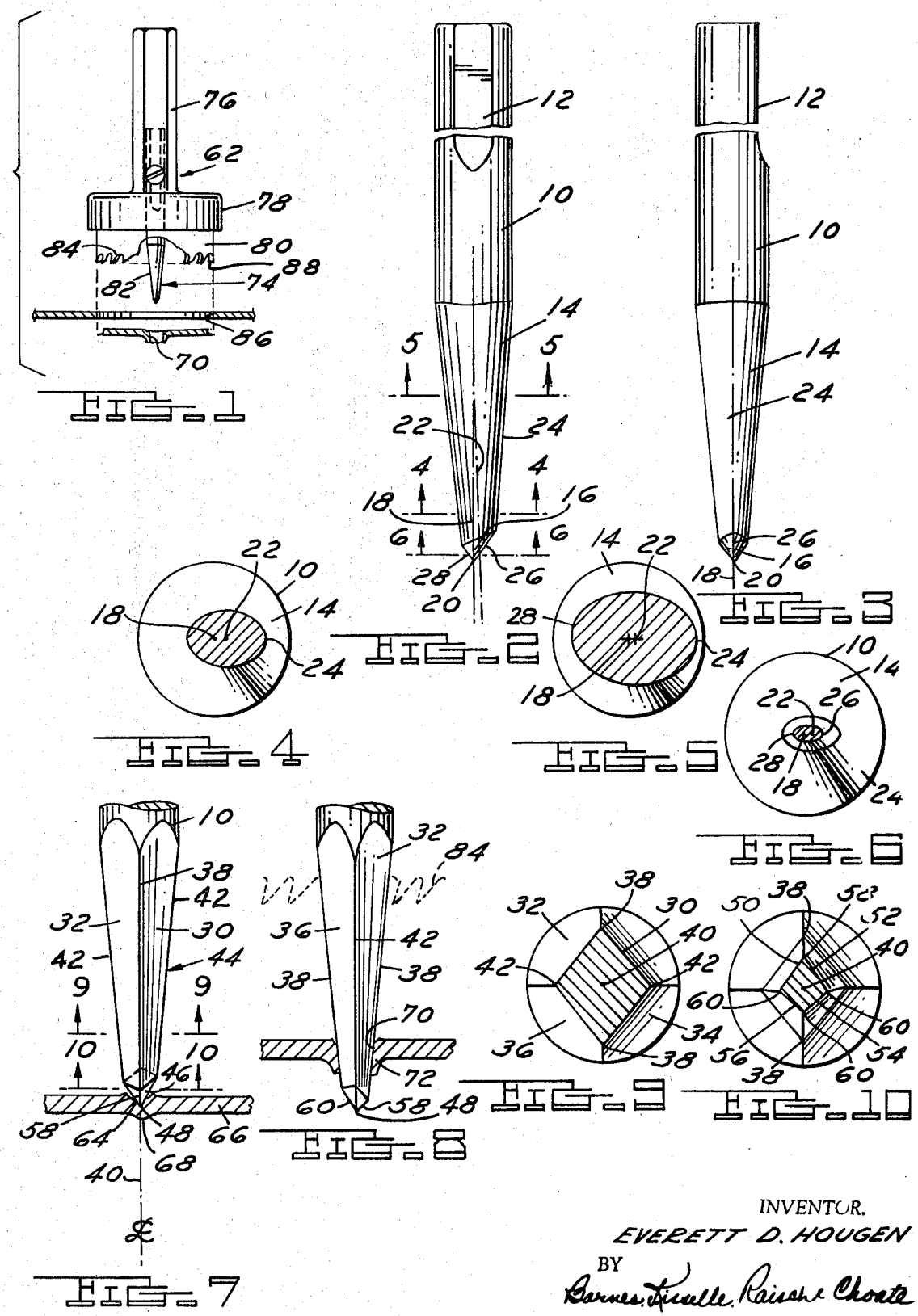

3,559,445
PIERCING TOOL FOR SHEET MATERIAL
Everett D. Hougen, G-5072 Corunna Road,
Flushing, Mich. 48504
Filed May 6, 1968, Ser. No. 726,856
Int. Cl. B21d 31/02, 37/00, 28/26, 28/34
U.S. Cl. 72—325          10 Claims

ABSTRACT OF THE DISCLOSURE

A tool for piercing holes in sheet material, such as sheet metal, plastic, etc., having a tapered portion terminating in a point. The tapered portion having at least one blunt tapered edge which extends down to the pointed end of the tool which projects radially from the rotating axis of the tool a greater extent than the remaining surface portion of the tapered portion of the tool.

---

This invention relates to a tool for piercing holes in sheet material such as sheet metal, plastic, etc.

Holes, particularly small diameter holes of up to ¼" or so, are normally formed in sheet material, such as sheet metal, by drilling. The problems encountered in forming such holes with a conventional drill involve a relatively high rate of drill breakage, a rapid dulling of the drill so that it requires frequent resharpening and the relatively long time it requires to drill the hole.

It is an object of this invention to provide a piercing tool which is shaped to more or less extrude a hole in sheet material as distinguished from cutting a hole. The tool is characterized by the fact that the working edges are relatively blunt as distinguished from being sharp so that they displace material radially and axially as distinguished from cutting the material. The tool is characterized by a tapered portion consisting of two axially contiguous tapered sections; one of which terminates in a pointed end and the other of which extends between the pointed end portion and the shank of the tool. The working edge of the pointed end of the tool is inclined to the rotating axis of the tool at a substantially greater angle than the working edge of the other tapered section of the tool. The blunt working edges of the tool are formed by surfaces which diverge in a direction radially toward the axis of the tool so that these blunt working edges are solidly backed up by the body of the tool and, thus, do not wear readily.

In the drawings:

FIG. 1 is a side elevational view, with a portion broken away, of a hole saw employing the piercing tool of this invention.

FIG. 2 is an elevational view of the piercing tool of this invention.

FIG. 3 is a view taken at right angles to FIG. 2.

FIG. 4 is a sectional view taken along the line 4—4 in FIG. 2.

FIG. 5 is a sectional view taken along the line 5—5 in FIG. 2.

FIG. 6 is a sectional view taken along the line 6—6 in FIG. 2.

FIG. 7 is a fragmentary elevational view of another form of the piercing tool of the present invention and illustrating the manner in which it penetrates into a sheet of metal.

FIG. 8 is a view taken at right angles to FIG. 7 and showing the tool forming the hole through the metal sheet.

FIG. 9 is a sectional view taken along the line 9—9 in FIG. 7.

FIG. 10 is a sectional view taken along the line 10—10 in FIG. 7.

The tool of the present invention is formed from hardened high speed steel rod and has a shank 10 with a diameter corresponding to the diameter of the hole to be cut. If desired, a flat 12 may be ground on one or more sides of shank 10 to facilitate gripping the tool in a chuck or the like. The basic feature of the piercing tool of this invention has to do with the extrusion, as distinguished from cutting, of a panel material to form a hole in the panel. This extrusion of the material is accomplished by providing on the tool a tapered edge or surface portion of very localized extent which projects radially from the axis of rotation of the tool further than other peripheral portions of the tool. The tool is shaped so that the working edge or surface receives substantial backing from the body of the tool so as to minimize wear. In the embodiment of tool illustrated in FIGS. 2 through 6 the extruding action is obtained by forming a free end portion of the tool as a tapered elliptical section 14 which is ground to a pointed end 16. The central axis of the tool is designated 18 and passes through the point 20 of the tool. As shown in FIGS. 4 and 5, the elliptical section 14 is generated about an axis 22 which, adjacent the free end of the tool, is inclined to the rotating axis 18 and is spaced therefrom. Thus in the arrangement illustrated in FIGS. 2 through 6 the tapered surface portion 24 at one side of elliptical section 14 is spaced from the axis 18 a greater radial distance than the remainder of the tapered elliptical surface of section 14. The end 16 of the tool is also ground to elliptical shape so that the tapered surface portion 26 at one side of end 16 is spaced further from the rotating axis 18 of the tool than the remainder of the elliptical surface of end 16. Stated differently, the end 16 is ground so that as viewed in FIG. 2 the portion 26 inclines to the axis 18 at a greater angle than the opposite side portion 28 of the end. However as mentioned previously, the point 20 of the tool lies on the axis 18.

The tool illustrated in FIGS. 7 through 10 is in principle constructed to accomplish the same result as the tool in FIGS. 2 through 6. However, the manner in which the tool shown in FIGS. 7 through 10 is constructed differs from that shown in FIGS. 2 through 6. In the tool of FIGS. 7 through 10 the tapered portion of the tool is ground with four flat faces 30, 32, 34 and 36. These flats are ground so that two of the opposite edges of intersection (the edges designated 38 in FIG. 9) are spaced more remotely from the axis 40 of the tool than are the remaining two opposite edges 42. Thus the tapered portion, generally designated 44, is somewhat diamond shaped in cross section.

The lower end 46 of the tool is ground to a point 48 which lies on the axis 40 of the tool. The end 46 is fashioned by grinding four flats 50, 52, 54 and 56. As shown in FIG. 10, these flats are ground so that the tapered edge 58 between faces 50, 52 is located more remotely from the axis 40 than are the remaining edges 60. In the embodiment illustrated, the edges 60 are not concentric to or spaced equally from the axis 40 of the tool. This is not significant. It is important, however, that edge 58 be located slightly more remotely from the axis than the remaining edges 60. Stated differently, the included angle between faces 50, 52 should be slightly less than 90°. This is also true of the included angles between faces 30, 32 and faces 34, 36.

The tool of the present invention may be employed in the chuck of a hand-held drill or in the chuck of a drill press. Also as shown in FIG. 1, the tool may be employed as a center piercing pilot for a hole saw, generally designated 62. In any event, when the piercing tool is rotated and brought into contact with a panel of sheet material (sheet steel for example), the material of the panel yields in response to moderate axial pressure applied to the tool while the tool is rotated. The yielding action in the metal is illustrated in FIG. 7. The pointed end of the tool, the end 46 in FIG. 7, initially forms a slight tapered dimple 64 on the upper face of the panel 66 and a small pimple 68 on the underface of the panel. Upon the continued application of downward pressure the radially outermost edge or surface portion, that is the edge 58 in the tool of FIGS. 7 through 10 and the surface portion 26 in the tool of FIGS. 2 through 6, displaces the panel material downwardly and radially outwardly in a progressive manner until a point is reached where the end point 48 (or the end point 20) penetrates through the panel. Thereafter upon continued application of axial pressure the hole 70 formed in the panel is gradually increased in size by the longer tapered working portion of the tool. In the case of the tool illustrated in FIGS. 2 through 6 this longer working portion comprises the surface portion 24; in the case of the tool illustrated in FIGS. 7 through 10 this longer tapered working portion comprises the opposite edges 38. The action of the two tools in this respect is somewhat similar; the only essential difference being that in the tool illustrated in FIGS. 2 through 6 the single surface portion 24 is relied upon to enlarge the hole by downward and outward extrusion of metal whereas in the case of the tool illustrated in FIGS. 7 through 10 the two edges 38 are relied upon for this purpose.

It will be noted that the tapered edge 58 and the tapered surface 26 are inclined to the axis of the tool at a substantially steeper angle than the longer tapered working portion above the lower end of the tool. More specifically, the tapered portion 26 is inclined to the axis 18 of the tool shown in FIGS. 2 through 6 at a substantially steeper angle than the tapered surface portion 24. Likewise, the tapered edge 58 of the tool shown in FIGS. 7 through 10 is inclined to the axis 40 at a much steeper angle than the tapered edges 38. The tool is fashioned in this manner so that the pointed end will have substantial body to it and will not become dulled readily. The longer tapered portions of the tool come into operative action after the hole in the panel is initially formed by the point of the tool and, thus, these portions are not subjected to as severe working as is the pointed end of the tool. Therefore, while the upper longer tapered edges may be inclined to the axis of the tool at an angle of say 5° to 10°, the surface 26 and the edge 58 are preferably inclined to the axis of the tool at an angle of between 30° to 50°. These angles are not critical; it only being necessary that these angled surfaces at the pointed end of the tool be rather blunt as compared with the longer tapered edges so as to be capable of withstanding high unit pressure but sufficiently pointed to penetrate through the panel material.

While the tool of the present invention may be employed for piercing holes in materials of different types, such as wood, plastic, metal and the like, experience has shown that the most remarkable results have been obtained with sheet steel. Holes of up to ¼" in diameter have been pierced in sheet steel of 18 gauge in thickness with no difficulty and the tool remains sharp after piercing many hundreds of holes. In the case of sheet steel, the axial extent of the edge 58 or the surface 26 should preferably be equal to at least the thickness of the panel in which the hole is being formed. The relationship is desired so that the stronger edge of the pointed end of the tool will be solely operative until at least the point on the tool breaks through the metal. After the point breaks through the metal less severe work on the tool is required to enlarge the hole and this additional work can be performed by the longer tapered edges of the tool. Thus in the case of a piercing tool used for sheet metal, it is preferred to have the axial extent of edge 58 or surface 26 of at least .035" to .045".

One of the advantages of the piercing tool of the present invention is that in the case of sheet metal as the tool penetrates through the work and enlarges the hole formed it extrudes a flange 72 around the edge of the opening on the bottom side of the panel. This flange is ideally suited on panels where sheet metal screws are to be employed within the holes so pierced. A further desirable feature of the instant tool is that it eliminates the need for prick-punching the panel at the location of the intended hole. The point at the extreme end of the tool is sufficiently sharp to immediately locate and stay at a fixed point when the rotating tool is brought into contact with a panel.

The tool of this invention is also ideally suited for use as a center piercing pilot in a hole saw. The specific details of the hole saw indicated at 62 in FIG. 1 are disclosed in my co-pending application, filed concurrently herewith, Ser. No. 726,855, and entitled "Hole Saw." When used in a hole saw the piercing tool, generally designated 74 in FIG. 1, is inserted and locked in place within a socket of an arbor 76. The arbor has a cup-shaped holder 78 mounted thereon and within the holder there is press fitted a saw blade 80 rolled into cylindrical shape. Tool 74 is mounted within arbor 76 so that the tapered portion 82 extends above the lower ends of the teeth 84 on blade 80. The tapered portion 82 of the tool thus projects substantially below the teeth 84. This arrangement has a dual advantage. It enables locating the tip of the tool at a desired location without any difficulty since the tip of the tool is readily visible. A more important advantage is the fact that the tapered portion 82 of the tool extrudes a tapered centering hole in the panel which increases progressively in diameter as the saw progresses through the work. Since the tapered portion of the tool terminates above the teeth, it follows that until the lower edges of the teeth 84 break through the panel the piercing tool has a close fit with the hole 70 being pierced so that the saw maintains a true concentric position relative to the hole. This is especially true in connection with the tool illustrated in FIG. 7 wherein the working edges 38 are diametrically opposed. Thus when a piercing tool of the type disclosed is utilized as a center pilot and hole piercing member of a hole saw, the hole 86 formed in the panel by the blade 80 is truly circular as distinguished from being egg-shaped as is the case with conventional hole saws. This fixed accurate location of the hole saw is enhanced by shaping the cutting edges of teeth 84 on blade 80 so that they are high on the outside and low on the inside as indicated at 88 and as disclosed more fully in said co-pending application.

Thus it will be seen that the present invention provides a piercing tool which is admirably suited for forming relatively small holes in sheet material, such as sheet metal, plastic panels, etc. The tool enables formation of the hole without the necessity of prick-punching the surface at the location of the intended hole. Since the working edges of the tool are relatively blunt and since the tool relies on the extruding action as distinguished from a cutting action, it is subjected to very little wear. As a matter of fact, experience has shown that the pointed end of the tool is self-sharpening. The tool of the present invention enables holes to be drilled in sheet metal at a much more rapid rate than with a conventional drill. As pointed out above, the piercing tool of the present invention is especially useful as a center pilot of a hole saw since the tapered hole forming portion of the tool accurately locates the hole saw about a fixed axis.

I claim:

1. A rotary tool for forming holes in sheet material such as sheet metal, comprising an elongate member having a shank at one end adapted to be gripped in a rotating driver and rotated about the central longitudinal axis of the tool, said elongate member having an axially tapered portion extending to the opposite end of the member, said tapered end portion comprising two axially contiguous portions, one at the extreme end of the tool and one adjacent the shank, said extreme end portion being tapered at a substantially greater angle to the longitudinal axis of the tool than the other portion, said extreme end portion having an axially tapered edge portion on the surface thereof which is spaced radially from the longitudinal central axis of the tool a greater distance than the remaining tapered surface of the extreme end portion, said other tapered portion having at least one axially tapered edge portion on the surface thereof spaced radially from the axis of the tool a greater distance than the remaining tapered surface of said other tapered portion, each of said edge portions being defined by surfaces which diverge radially in the direction of the axis of the tool, said extreme end portion terminating in a sharp pin point lying on the axis of the tool and said tapered edge portion thereof extending radially inwardly and axially to said sharp point.

2. A tool as called for in claim 1 wherein said other tapered portion has an axial extent at least several times the axial extent of said extreme end portion.

3. A tool as called for in claim 2 wherein the first-mentioned tapered edge portion is inclined to the axis of the tool at an angle of about 30° to 50° and the second-mentioned tapered edge portion is inclined to the axis of the tool at an angle of about 5° to 10°.

4. A tool as called for in claim 2 wherein said other tapered portion has not more than two of said tapered edge portions.

5. A tool as called for in claim 2 wherein said tapered edge portions are relatively blunt.

6. A tool as called for in claim 2 wherein said other tapered portion has only a pair of said tapered edge portions thereon which are diammetrically opposed.

7. A tool as called for in claim 6 wherein said pair of tapered edge portions are each defined by a pair of intersecting generally flat surfaces which are inclined to each other at an angle greater than about 60°.

8. A tool as called for in claim 7 wherein the tapered edge portion of said extreme end portion is defined by a pair of intersecting generally flat surfaces which are inclined to each other at an angle greater than about 60°.

9. A tool as called for in claim 6 wherein said other tapered portion is defined by four generally flat faces which intersect to form four tapered edge portions, the faces which define said two tapered edge portions being inclined to each other at an angle of slightly less than 90° and the remaining two tapered edge portions each being defined by two of said faces which are inclined to each other at an angle of slightly more than 90°.

10. A tool as called for in claim 9 wherein said extreme end portion is defined by at least three generally flat faces which intersect to form at least three tapered edge portions, the two faces which define said one tapered edge portion thereof being inclined to each other at an angle of less than 90° and each pair of intersecting faces which define the other tapered edge portions of said extreme end portion being inclined to each other at an angle greater than the angle between the faces which define said one tapered edge portion.

References Cited

UNITED STATES PATENTS

| 113,008 | 3/1871 | Bigelow | 83—660 |
| 123,841 | 2/1872 | Richardson | 83—660 |
| 314,845 | 3/1885 | Hubbard | 72—324 |
| 2,142,728 | 1/1939 | Kienzle | 83—660 |
| 2,145,725 | 1/1939 | Jamieson | 30—366 |
| 2,566,738 | 9/1951 | Mitchell | 83—660 |
| 3,162,211 | 12/1964 | Barusch | 72—325 |
| 3,230,813 | 1/1966 | Norsted | 83—660 |

FOREIGN PATENTS

| 552,376 | 12/1956 | Italy | 72—325 |

RICHARD J. HERBST, Primary Examiner

E. M. COMBS, Assistant Examiner

U.S. Cl. X.R.

72—379; 83—660